(12) United States Patent
Kunz et al.

(10) Patent No.: US 8,068,482 B2
(45) Date of Patent: Nov. 29, 2011

(54) METHOD AND SYSTEM FOR NETWORK SWITCH ELEMENT

(75) Inventors: James A. Kunz, Plymouth, MN (US); Frank R. Dropps, Maple Grove, MN (US); Edward C. Ross, Edina, MN (US); Mark A. Owen, Apple Valley, MN (US); Craig M. Verba, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 308 days.

(21) Appl. No.: 12/556,064

(22) Filed: Sep. 9, 2009

(65) Prior Publication Data

US 2010/0118880 A1 May 13, 2010

Related U.S. Application Data

(60) Provisional application No. 61/114,329, filed on Nov. 13, 2008.

(51) Int. Cl.
*H04L 12/50* (2006.01)
*H04Q 11/00* (2006.01)
*H04L 12/28* (2006.01)
*H04L 12/56* (2006.01)

(52) U.S. Cl. .................................... 370/386; 370/401

(58) Field of Classification Search ............... 370/351, 370/360, 386–389
See application file for complete search history.

(56) References Cited

U.S. PATENT DOCUMENTS

| | | | |
|---|---|---|---|
| 6,240,096 B1 | 5/2001 | Book | |
| 6,389,017 B1 * | 5/2002 | Patel et al. | 370/389 |
| 6,944,786 B2 | 9/2005 | Kashyap | |
| 7,274,696 B1 * | 9/2007 | Sikdar | 370/391 |
| 7,406,092 B2 | 7/2008 | Dropps et al. | |
| 7,660,302 B2 * | 2/2010 | McGlaughlin | 370/389 |
| 2003/0040898 A1 | 2/2003 | McWilliams et al. | |
| 2003/0193936 A1 * | 10/2003 | Wolrich et al. | 370/360 |
| 2004/0264786 A1 | 12/2004 | McElvain | |
| 2005/0111433 A1 * | 5/2005 | Stewart | 370/351 |
| 2006/0143357 A1 | 6/2006 | Shaw et al. | |
| 2006/0251067 A1 | 11/2006 | DeSanti et al. | |
| 2010/0061242 A1 * | 3/2010 | Sindhu et al. | 370/235 |

OTHER PUBLICATIONS

"International Preliminary Report on Patentability from The International Bureau of WIPO dated May 26, 2011 for PCT Application No. PCT/US2009/063162".
"International Search Report from ISA/US dated Feb. 26, 2010 for International Application No. PCT/US2009/063162".
"Written Opinion from ISA/US dated Feb. 26, 2010 for International Application No. PCT/US2009/063162".

* cited by examiner

*Primary Examiner* — Ayaz Sheikh
*Assistant Examiner* — Blanche Wong
(74) *Attorney, Agent, or Firm* — Klein, O'Neill & Singh, LLP (57) ABSTRACT

Method and system for a network switch element is provided. The switch element includes a plurality of megaports, each megaport uniquely identified by a unique megaport address identifier for network addressing. Each megaport includes a plurality of operational ports, each operational port identified by a unique operational port address identifier. The switch element also includes a local crossbar for communication between the plurality of operational ports, and a shared logic module configured to provide common control of the plurality of operational ports within a megaport to allow operational ports to share resource of a single megaport to route network packets there between. The switch element also includes a global crossbar configured to allow communication between the megaports.

22 Claims, 9 Drawing Sheets

METHOD AND SYSTEM FOR NETWORK SWITCH ELEMENT

CROSS REFERENCE TO RELATED APPLICATION

This patent application claims priority to U.S. provisional patent application, entitled "Method and System for Network Switch Element"; Ser. No. 61/114,329, filed on Nov. 13, 2008, the disclosure of which is incorporated herein by reference in its entirety.

BACKGROUND

1. Technical Field

The present disclosure relates to networks.

2. Related Art

Networking systems are commonly used to move network information (may also be referred to interchangeably, as frames, packets or commands) between computing systems (for example, servers) or between computing systems and network devices (for example, storage systems). Various hardware and software components are used to implement network communication. Different network and storage protocols may be used to handle network information and storage information. Continuous efforts are being made to enhance the use of networking and storage protocols.

A network switch is typically a multi-port device where each port manages a point-to-point connection between itself and an attached system. Each port can be attached to a server, peripheral, input/output subsystem, bridge, hub, router, or another switch. The term network switch as used herein includes a multi-Level switch that uses plural switching elements within a single switch chassis to route data packets.

For high performance high port count single chip switches, dedicated data/control paths from each Ingress port (a port that receives information) to each Egress port (a port that transmits information) may produce a relatively high global wire port connection count. The high global wire port connection count introduces internal routing, timing and chip area issues. Continuous efforts are being made to reduce the number of connections.

SUMMARY

In one aspect of the disclosure, problems involving global wire port connection count may be reduced by grouping ports together to form megaports. The megaports may include shared local routing resources within the megaport and a set of global paths to all other megaports that may be residing on a common chip.

In one embodiment, a network switch element is provided. The switch element includes a plurality of megaports, each megaport uniquely identified by a unique megaport address identifier for network addressing. Each megaport includes a plurality of operational ports, each operational port identified by a unique operational port address identifier.

The switch element also includes a local crossbar for communication between the plurality of operational ports, and a shared logic module configured to provide common control of the plurality of operational ports within a megaport to allow operational ports to share resource of a single megaport to route network packets there between. The switch element also includes a global crossbar configured to allow communication between the megaports.

In another embodiment, a process for transmitting and receiving network packets in a switch element is provided. The process includes providing a plurality of megaports identified by a unique address identifier for network addressing, each megaport includes a plurality of operational ports, each operational port identified by a unique operational port address identifier; and sharing communication resources between the operational ports within each megaport to allow the operational ports to route packets therebetween and between each of the plurality of megaports.

In another embodiment a process for receiving and transmitting network packets in a switch element having a plurality of megaports is provided. Each megaport includes a plurality of operational ports and a shared logic module. The process includes: (a) receiving a packet at a receive segment of an operational port of one of the plurality of megaports; (b) generating a request to fetch the received packet from the receive segment; (c) sending a copy of the request to a transmit segment of the first operational port; wherein the request includes information regarding a location where the packet is stored at the receive segment and identity of the operational port that received the packet; (d) adding a switch routing header (SRH) to the packet before sending the packet to the transmit segment of the operational port; and the SRH identifies the operational port that received the packet and the location where the packet is stored; (e) comparing the SRH in the packet with information provided in the request; and (f) placing the packet on a correct transmission path for temporary storage at the transmit segment, before the packet is transmitted to a proper destination.

In yet another embodiment a process for receiving and transmitting network packets in a switch element having a plurality of megaports is provided. Each megaport includes a plurality of operational ports and a shared logic module. The process includes: (a) receiving a packet at a receive buffer of a operational port of one of the plurality of megaports; (b) generating a packet tag with information related to the packet including a location of the packet in the receive buffer; (c) storing the packet tag in a tag buffer of the operational port; and (d) determining whether or not to forward the tag based on a combined lane width and speed at which the operational port is operating, a lane width and speed at which a destination operational port is operating and an indication as to a percent data received at operational port.

This brief summary has been provided so that the nature of the disclosure may be understood quickly. A more complete understanding of the disclosure may be obtained by reference to the following detailed description of embodiments thereof in connection with the attached drawings.

BRIEF DESCRIPTION OF THE DRAWINGS

The foregoing and other features of the embodiments will now be described with reference to the drawings. In the drawings, the same components have the same reference numerals. The illustrated embodiments are intended to exemplify, the adaptive aspects of the present disclosure. The drawings include the following figures.

DETAILED DESCRIPTION

The following definitions are provided for convenience as they are typically (but not exclusively) used in the storage and networking environment, implementing the various adaptive aspects described herein.

"DLID": Destination local identifier is a field in an IB packet identifying a local subnet packet destination.

"IB" means InfiniBand, a switched fabric interconnect standard for servers, incorporated herein by reference in its entirety. IB technology is deployed for server clusters/enterprise data centers ranging from two to thousands of nodes. The IB standard is published by the InfiniBand Trade Association. An IB switch is typically a multi-port device. Physical links (optical or copper) connect each port in a switch to another IB switch or an end device (for example, Target Channel Adapter (TCA) or a Host Channel Adapter (HCA)).

"Inter switch link" or "ISL": A physical link that is used for connecting two or more IB switches.

"Multi Level Switch": A switch that includes a plurality of switch elements operationally coupled together.

"Packet": A group of one or more network data word(s) used for network communication.

"Port": A structure (physical or logical) within a network element for sending and receiving network information via a network connection.

"Routing Table": A table that stores information for routing a packet.

"SLID": Source local identifier is a field in an IB packet identifying local subnet packet source.

"Switch": A device that facilities network communication conforming to IB and other switch standards/protocols.

"Virtual Lane" (VL): The term VL as defined by Section 3.5.7 of the IB Specification provides a mechanism for creating virtual links within a single physical link. A virtual lane represents a set of transmit and receive buffers in a port. A data VL is used to send IB packets and according to the IB Specification, configured by a subnet manager based on a Service Level field in a packet.

As used in this disclosure, the terms "component" "module", "system," and the like are intended to refer to a computer-related entity, either software-executing general purpose processor, hardware, firmware or a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized for execution on one processor or more than one processor. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Processor executable components can be stored, for example, on computer readable media including, but not limited to, an ASIC (application specific integrated circuit), CD (compact disc), DVD (digital video disk), ROM (read only memory floppy disk, hard disk, EEPROM (electrically erasable programmable read only memory), memory stick or any other storage device, in accordance with the claimed subject matter.

To facilitate an understanding of the various embodiments, the general architecture and operation of a network system will be described. The specific architecture and operation of the various embodiments will then be described with reference to the general architecture of the network system.

Figure 1A:
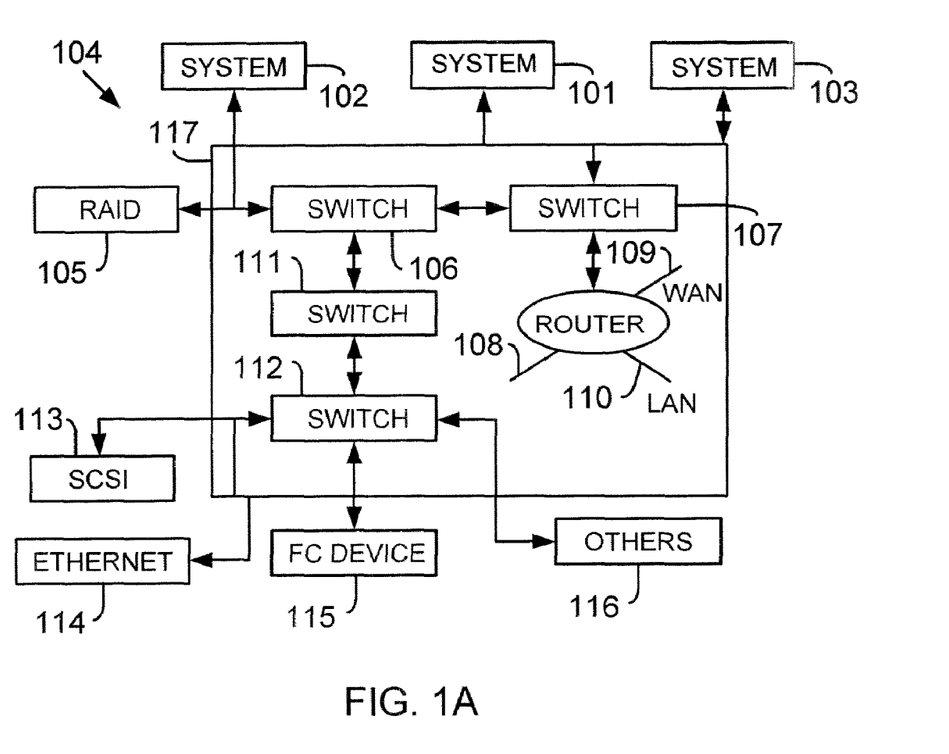
FIG. 1A shows a block diagram of a network system, according to one embodiment.

Network System: FIG. 1A shows a block diagram of a generic network system 104 with various devices, used according to one embodiment. System 104 includes a fabric 117, which includes a plurality of switches 106, 107, 111 and 112 for moving network packets. Fabric 117 may also include a router 108 that is coupled to a wide area network 109 and local area network 110.

Switch 106, for example, may be operationally coupled to a RAID storage system 105 and system 102, while system 101 and 103 may be operationally coupled to switch 107. Switch 112 may be coupled to a small computer system interface ("SCSI") SCSI port 113 that is coupled to SCSI based devices. Switch 112 may also be coupled to an Ethernet port 114, Fibre Channel device(s) 115 and other device(s) 116.

Systems 101-103 typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Figure 1B:
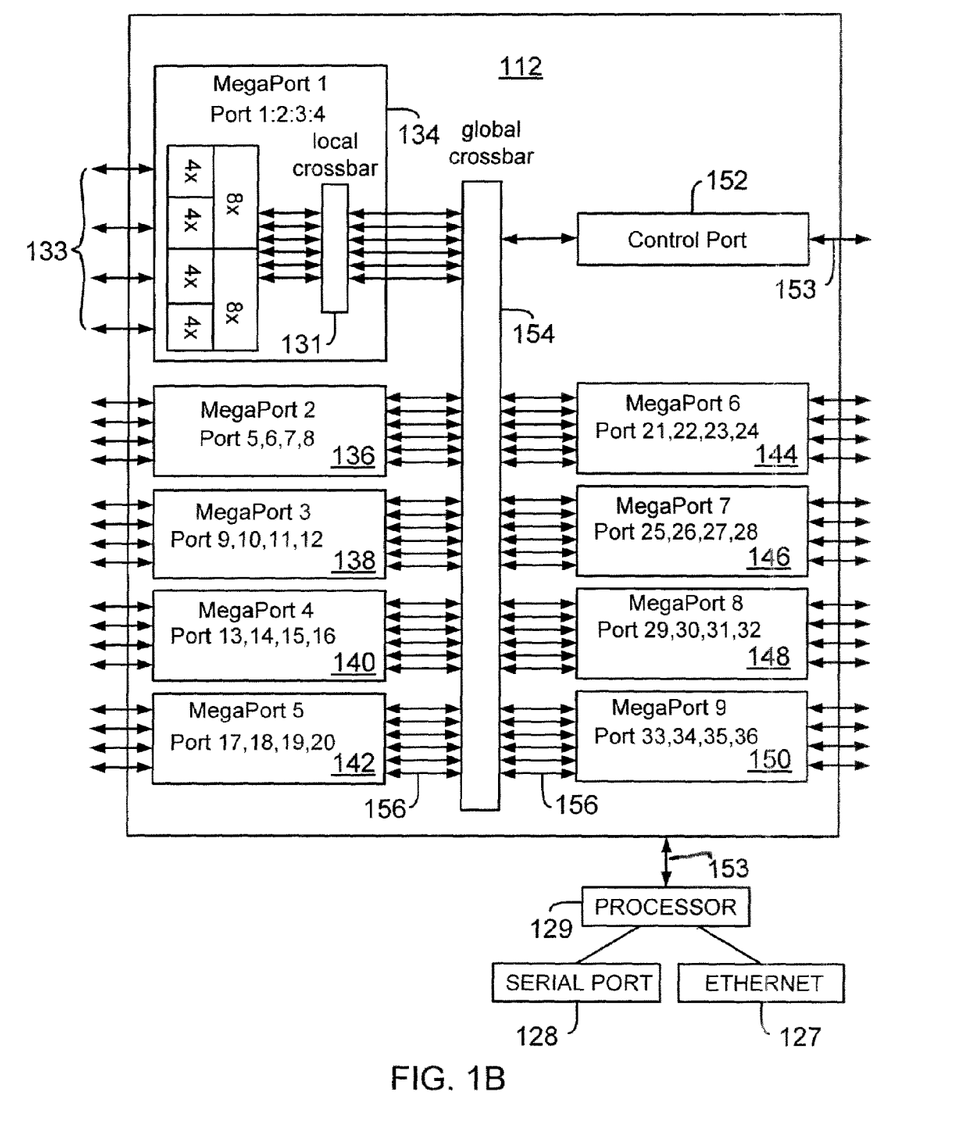
FIG. 1B shows a block diagram of a switch element with megaports, according to one embodiment

Switch with Megaports:

FIG. 1B shows a block diagram of switch 112 having a plurality of megaports (may also be referred to as "Mport"), for example, Mport 1 134, Mport 2 136, Mport 3 138, Mport 4 140, Mport 5 142, Mport 6 144, Mport 7 146, Mport 8 148 and Mport 9 150 that are described below in detail. Switch 112 may also include a control port 152 (hereinafter "Cport 152"), and global crossbar 154. Global crossbar 154 allows the Mports to communicate with each other.

Cport 152 may include one or more registers for storing configuration information for one or more Mports. A switch processor (not shown) (or external processor 129) via connection 153 may be used to set Cport 152 settings for controlling overall switch 112 and/or Mport operations.

In addition, switch 112 may be coupled to external processor 129 that is coupled to an Ethernet port 127 and a serial port 128. In one aspect of the present disclosure, processor 129 may be a part of computing systems 101-103 (FIG. 1A). An administrator may use processor 129 to configure switch 112.

In one embodiment, as shown in FIG. 1B, switch 112 may include more than one Mport. Each Mport may include more than one operational port, referenced as a sub-port (also referred to as a "S-Port"). By configuring the Mport to include more than one S-port, the total number of ports that can be used in switch 112 may be increased without having to hard wire each port individually.

As an example, each Mport may include four S-ports. Mport 1 (134), for example, includes S-ports 1, 2, 3 and 4, Mport 2 (136) includes S-ports 5, 6, 7 and 8 and so forth. In one embodiment, switch 112 may include 9 Mports (134, 136, 138, 140, 142, 144, 146, 148 and 150), each having 4 S-ports, which provides switch 112 the option of having 36 operational ports. Instead of hardwiring all the 36 ports, only the 9 Mports are connected via global crossbar 154, while switch 122 can utilize 36 ports.

It should be understood that although the embodiment of FIG. 1B is shown to include a specific number of S-ports and Mports, these numbers are exemplary and, thus, switch 112 is not limited to any particular number of S-ports or Mports.

To operate within network system 104 (FIG. 1A), each Mport has a unique address identifier for network addressing and hence operates as an independent network entity. Each S-port, within an Mport also has a unique identifier, which the S-port can use to send and receive packets.

Each Mport on switch 112 may be coupled to other network devices using link 133. In one embodiment, network packets arrive at an S-port on the Mport via link 133 and then are routed within switch 112 using global cross bar 154. Packets are routed within the Mport using local crossbar 131. For example, a packet received at S-port 1 may be routed to S-port 4 using local crossbar 131. Local crossbar 131 also interfaces with global crossbar 154 so that network information may be transmitted between Mports. A Mport is described below in detail with respect to FIG. 3.

In one embodiment, each Mport may include six independent, 64 bit data paths 156 (4 G Bytes/s) to global crossbar 154 for moving network information among the Mports. In this embodiment, global crossbar 154 may be a 9×9 parallel synchronous Mport crossbar, providing 1728 G bit/s of non-blocking bandwidth.

Crossbar 154 includes a packet data crossbars a packet request crossbar, a packet tag crossbar and a control bus. The packet data crossbar functions such that any of the 55 sources (9 Mports×6 paths+Cport) may transfer a packet to any of the 37 port destinations (36 S-ports+Cport 152). In one embodiment, 37 packets may be transferred simultaneously.

The packet tag crossbar functions to move plural packet tags between ports. The packet request crossbar is used by a transmit port (or segment) of a S-port to request a particular packet from a receive buffer, as described below.

Figure 2A:
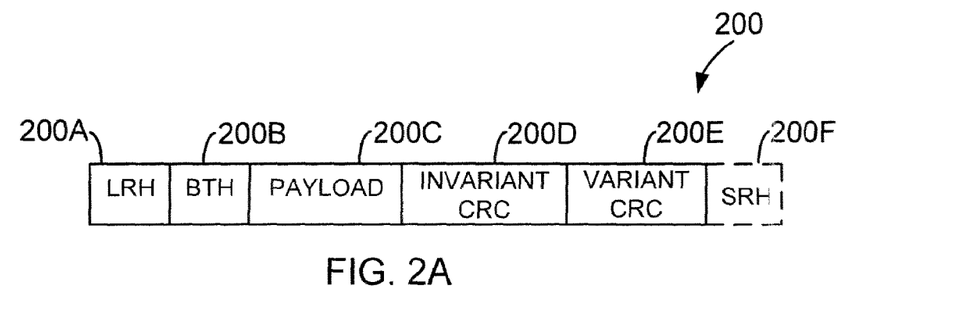
FIG. 2A shows a block diagram of a network packet structure used according to one embodiment.

Packet Structure: FIG. 2A provides an example of a packet structure that may be used in the various embodiments described herein. In one embodiment, packet 200 includes a local route header 200A, a base transport header (BTH) 200B, packet payload 200C, invariant cyclic redundancy code (CRC), and variant CRC 200E. Packet structure 200 is also described in Infiniband Architecture Specification, Volume 1, Chapter 6, titled "Data Packet Format".

Figure 2B:
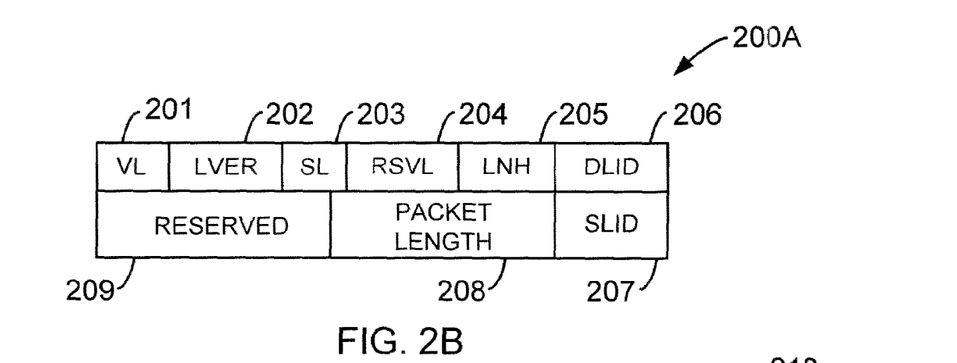
FIG. 2B shows a block diagram of a local route header in the packet structure of FIG. 2A, used according to one embodiment.

FIG. 2B shows a block diagram of local route header (LRH) 200A, where the local route includes the fields for local routing by switches within an InfiniBand subnet (LRH in InfiniBand (Subnet routing) is analogous to FC-2 in Fibre Channel and MAC layer (LAN routing) in Ethernet. In all three cases it is considered Layer 2 routing/switching information).

LRH 200A includes a VL field 201 that identifies which receive buffer and flow control credits should be used for processing a received packet, link version (Lver) field 202 specifies the version of the LRH packet 200A, service level (SL) field 203 is used by switch 112 to determine a transmit VL for a packet, and link next header (LNH) field 205 specifies what header follow the LRH 200A. Field 209 is a reserved field.

LRH 200A also includes a destination local identifier (DLID) field 206 that specifies the port to which switch 112 delivers the packet and source identifier (SLID) field 207 that indicates the source of the packet. Packet length field 208 specifies the number of words contained in a packet.

Figure 3:
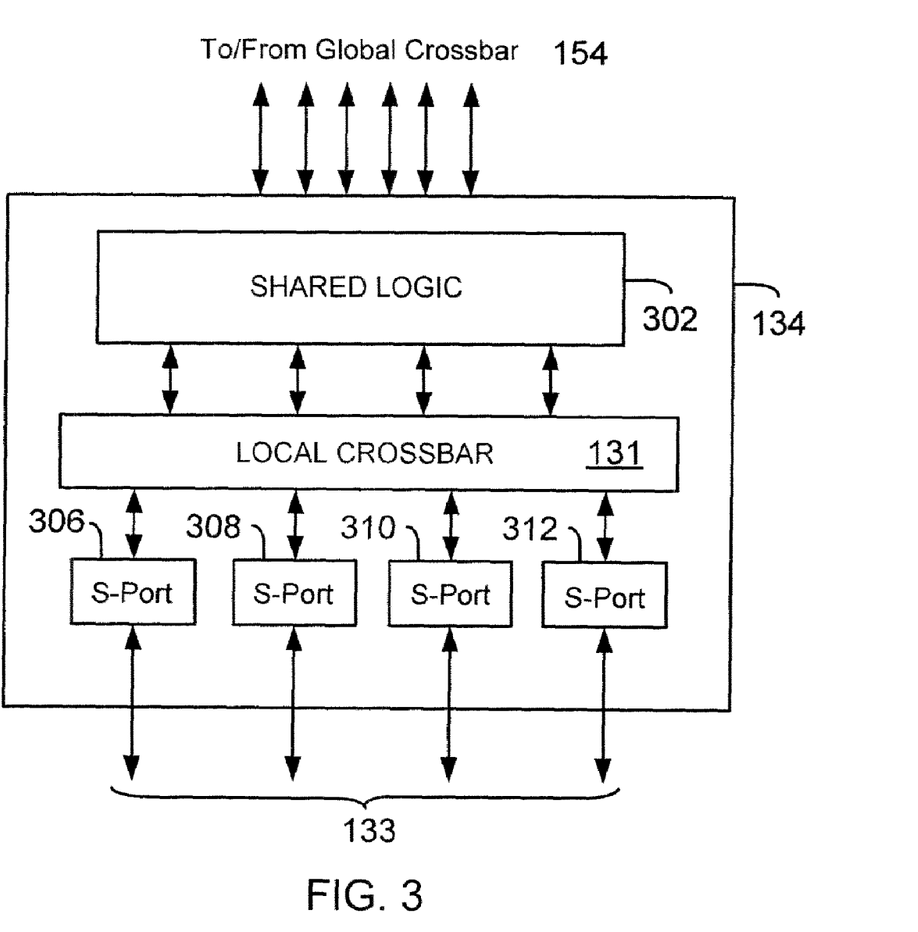
FIG. 3 shows another block diagram of a megaport, according to one embodiment.

Mport 134:

FIG. 3 shows a block diagram of Mport 134 according to one embodiment of the present disclosure. It should be understood that Mports 136-150 (FIG. 1B) may operate and function in the same manner as Mport 134.

In one embodiment, Mport 134 includes a common module (shown as shared logic) 302, which includes logic shared by four S-ports 306, 308, 310 and 312 and local cross-bar 131. Each S-port is coupled to other network devices via links 133. In one embodiment, using links 133, each S-port 306, 308, 310 and 312 may operate at 2.5 gigabits per second (Gb/s), 5 Gb/s, 10 Gb/s or any other speed.

Common module 302 allows each S-port to communicate with other S-ports/Mports using local crossbar 131 and global crossbar 154 (See FIG. 1B). Common module 302 is described below in more detail below with respect to FIG. 4.

Figure 4:
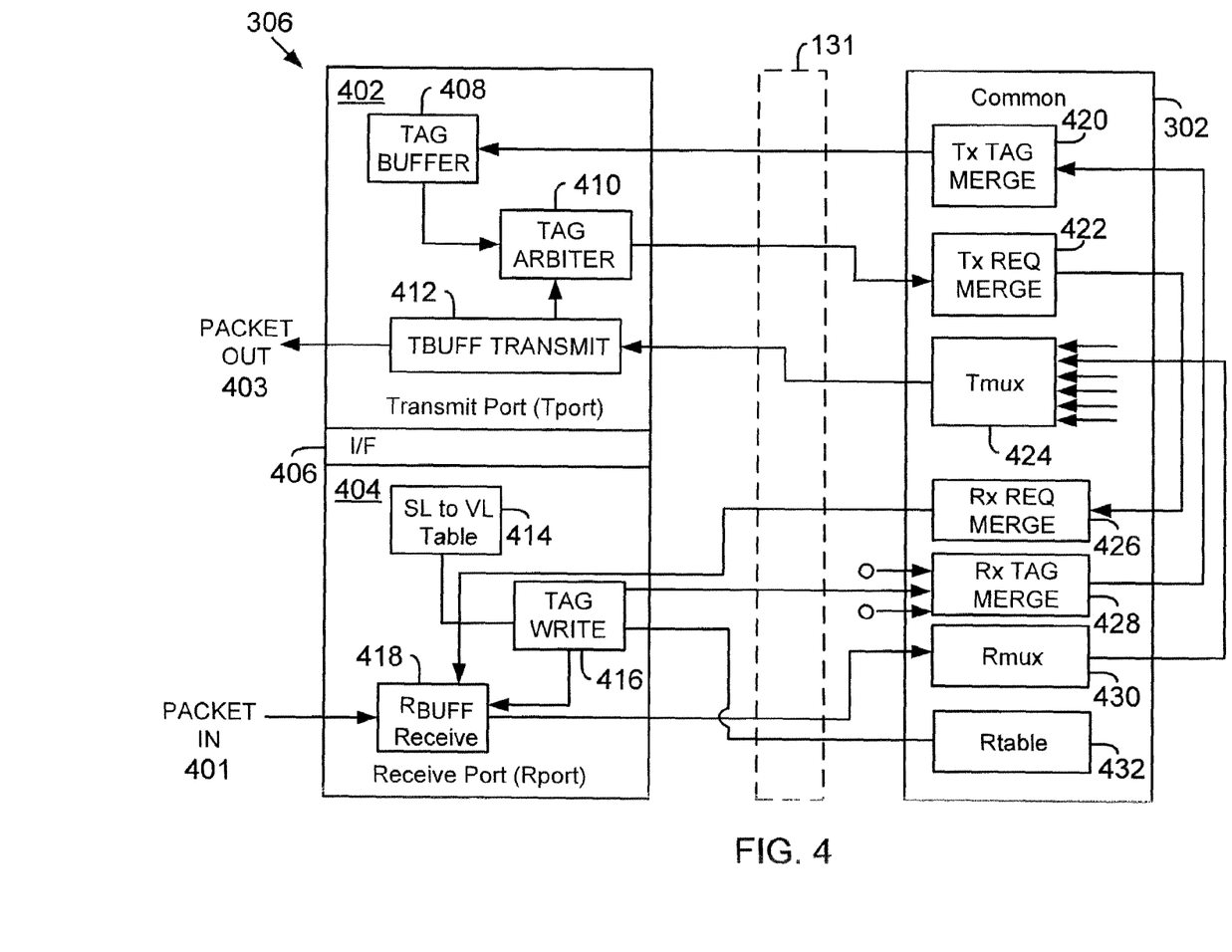
FIG. 4 is a simplified block diagram of subport (S-Port) used in a megaport, according to one embodiment.

FIG. 4 is a simplified block diagram illustrating common module 302, operationally coupled to S-port 306 via local crossbar 131 in accordance with an embodiment of the present disclosure. The operation of a single S-port 306 is described in FIG. 4 for clarity however, the processes and functions thus described apply to each other S-port 308, 310 and 312 in Mport 134, as well as to each other S-port in each other Mport in switch 112.

Common module 302 and S-port 306 include buffers, tables and modules that allow S-port 306 to share resources with other S-ports in a single Mport to effectively route packets. The shared resource arrangement allows for the reduction of the relatively high global wire port connection count typically associated with such high numbers of ports on a single chip. Local crossbar 131 includes a packet data crossbar, packet request crossbar, a packet tag crossbar and a control bus each of which operate as previously described.

In one embodiment, as shown in FIG. 4, S-port 306 includes a transmit port 402 (or transmit segment, also referred to as "Tport 402"), a receive port 404 (or receive segment, also referred to as "Rport 404") and an Interface (I/F) 406, which provides input/output interface to common module 302. Rport 404 receives incoming packets 401 from one of the links 133. The packets are processed and then temporarily stored at a temporary storage location, referred to herein as receive buffer 418 (hereinafter, "RBUF 418"). Tag writer 416 creates a tag for every packet that is received. The tag includes basic information about the packet and the storage location in receive buffer 418 where the packet is stored.

The tag is then transmitted to the Tport 402 via local crossbar 131 and shared logic 302. The tag at Tport 402 is stored at a tag buffer 408. A tag arbiter 410 selects a tag from among a plurality of tags that are stored at tag buffer 408. Once a tag is selected, a packet associated with the tag is pulled from RBUF 418 and then transmitted as packet 403 to the packet destination.

In one embodiment, common module 302, which provides "common" or shared logic for common port control, includes a transmit (Tx) tag merge module 420, a transmit (Tx) request merge module 422, a transmit data mux (Tmux) 424, a receive (Rx) request merge module 426, a receive (Rx) tag merge module 428 and a receive data mux (Rmux) 430. Common module 302 also includes a copy of a Routing Table (Rtable) 432 that is used for routing packets. The components of S-port 306 working with shared logic module 302 are now described in detail below.

Figure 5:
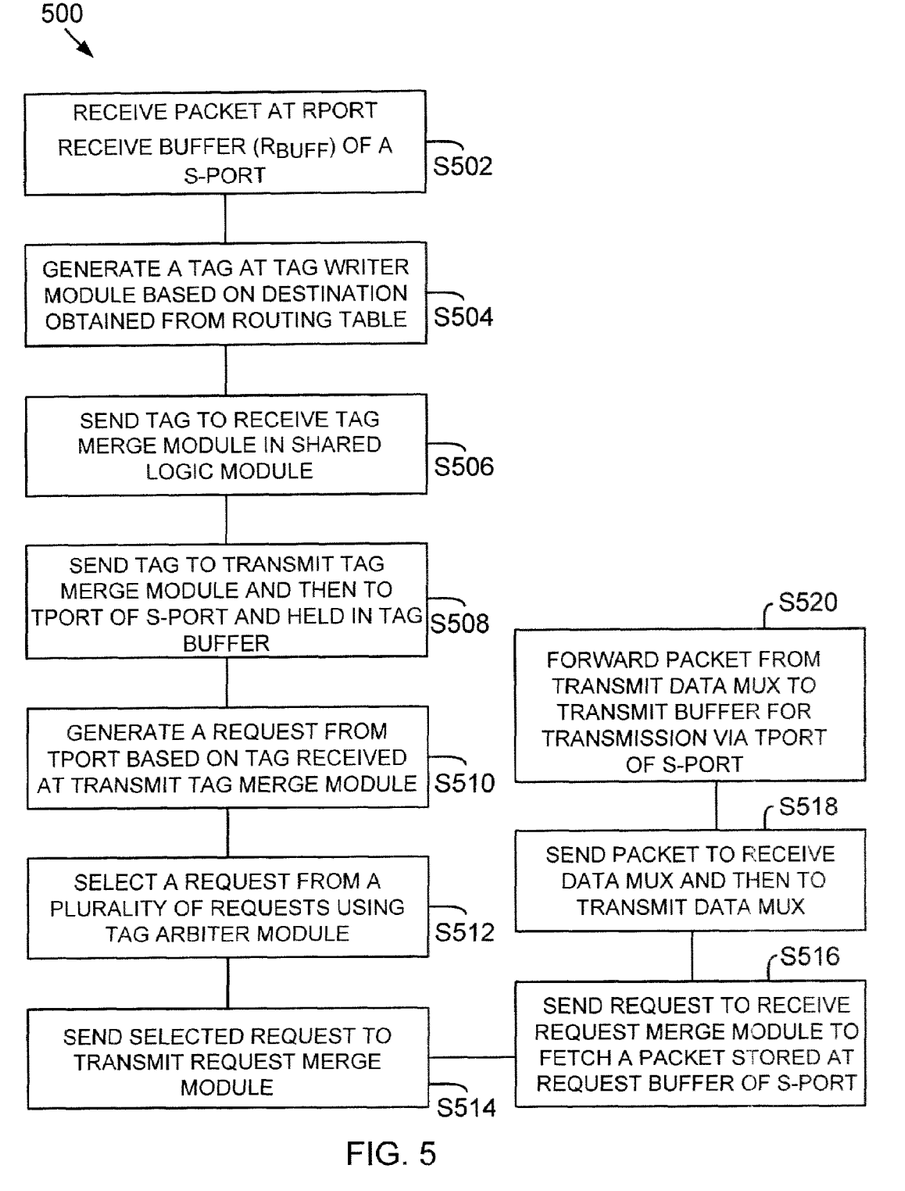
FIG. 5 is a flowchart illustrating a process for transmitting and receiving a packet via a S-port as part of a megaport (may also referred to as "Mport"), according to one embodiment.

Process Flow:

FIG. 5 is a flowchart illustrating the process 500 for transmitting and receiving a packet via a S-port of a Mport, according to one embodiment.

Figure 2C:
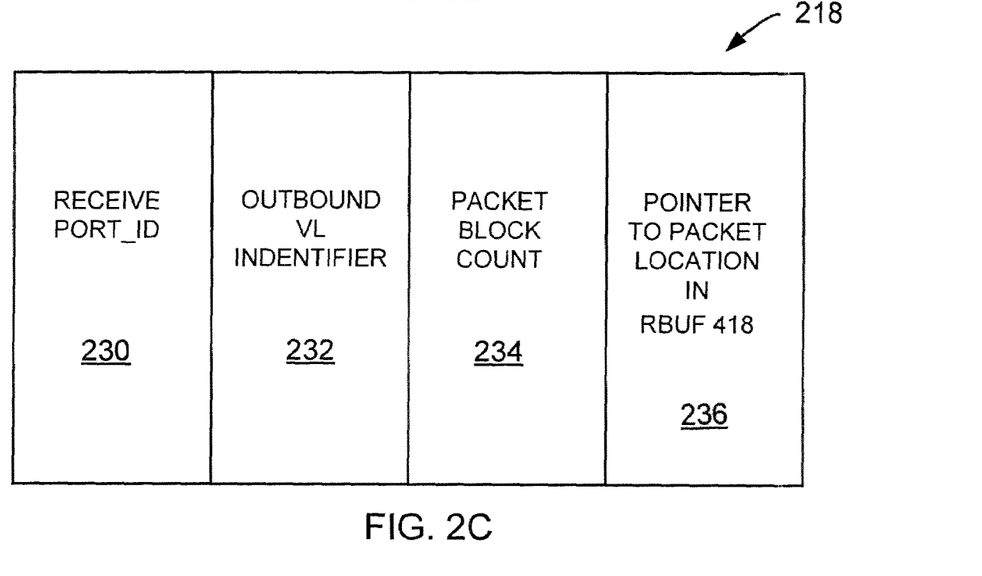
FIG. 2C shows an example of a tag, used according to one embodiment.

Referring now to FIG. 5, and with further reference to FIG. 4, initially a packet is received by Rport 404 and temporarily stored at RBUF 418 of S-port 306 (S502). As packets arrive, packet tags are generated by tag writer module 416 (S504). As shown in FIG. 2C, a packet tag, such as exemplary packet tag 218 may include a receive port identifier 230 (Receive Port_ID 230) that identifies the S-port receiving the packet. The packet tag 218 also identifies an outbound port VL identifier 232 that may be assigned using SL to VL table 414 at Rport 404. The tag 218 further includes the total packet size (or block count) 234 and a pointer 236 to a location in RBUF 418 where the packet is stored.

Next, tag writer module 416 sends the tag to common module 302 (S506). The tag is received in common module 302 at Rx tag merge module 428.

The tag is then delivered to a Tx tag merge module 420 that forwards the tag to Tport 402 of S-port 306 (S508). The tag is stored in tag buffer 408 and awaits further processing.

To process the tag, Tport 402 generates a request based on the tag received in tag buffer 408 from Tx tag merge module 420 (S510). Since a plurality of requests may be pending, tag arbiter module 410 selects a request from the plurality of requests (S512). A round-robin scheme may be used to select a tag from tag buffer 408. Once selected, tag arbiter module 410 sends the selected request to Tx request merge module 422 (S514).

The request is then forwarded to the Rx request merge module 426. The packet identified by the request is fetched from its location in RBUF 418 (S516). The packet is then sent to Rmux 430 and then to Tmux 424 (S518).

Tmux 424 forwards the packet to transmit buffer 412 of Tport 402 of S-port 306. The packet is then forwarded to its destination (S520) using routing table Rtable 432.

It should be understood that each S-port may be programmed and configured to a 1×, 4× or 8× port width and an associated single date rate (SDR), double data rate (DDR) or quad data rate (QDR) speeds.

Referring again to FIG. 1B, switch 112 uses global crossbar 154 to ensure that "groups" of Ingress ports on each Mport share a set of data paths to all groups of Egress ports on the switch. In one embodiment, an Egress port of any of the Mports that requests the packet from the Ingress port, for example, from RBUFF (or RBUF) (in the drawings we have used RBUFF and not RBUF. Let us make consistent) 418 of Rport 404, receives the packet on one of the six-shared paths 156 from one of the nine Mports (1 of 54 paths). Since it is desirable to ensure that the requested packet is properly selected for transmission, in one embodiment, each Mport includes a process to enable the selection of the proper path as described below.

Figure 6:
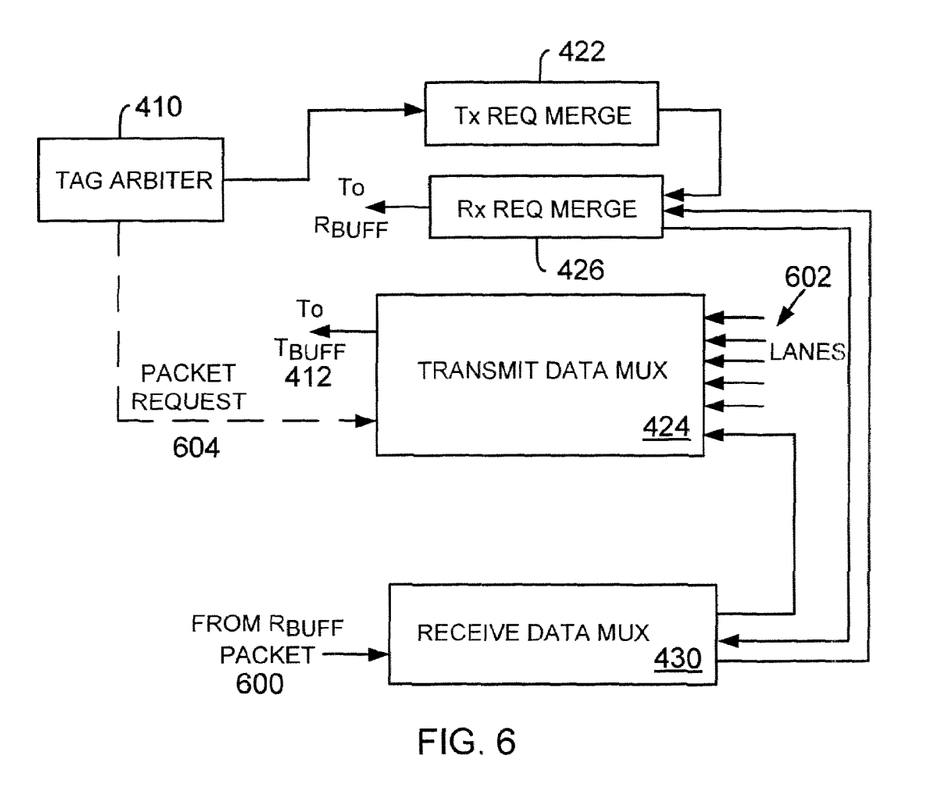
FIG. 6 is a simplified block diagram showing interaction between various elements of a megaport, according to one embodiment.

As shown in FIG. 6, in response to a packet request 604, a packet 600 is received by receive data mux 430. A copy of the packet request 604 that identifies the location of the packet in RBUF 418 (FIG. 4) is sent to the transmit data mux 424. When the receive data mux 430 receives packet 600, a switch routing header (SRH) (see FIG. 2A, 200F) is added to packet 600. SRH 200F identifies the S-port that received packet 600 and provides the location in RBUF 418, where packet 600 is stored. SRH 200F data is derived from a packet request data, an example of which is shown below in Table 1.

After adding the SRH 200F, packet 600 with SRH 200F is placed on one of the lanes 602. Transmit data mux 424 compares the SRH 200F with the fields in packet request 604. Based on the comparison, transmit data mux 424 selects one of the six paths of the local crossbar and moves the packet to transmit buffer (TBUFF) 412 so that it can be sent to its destination.

TABLE 1

| Name | Bits | Description |
| --- | --- | --- |
| — | 63:18 | Reserved |
| SubPort | 17:16 | Ingress or receiver Subport ID |
| Rsv | 15:11 | Reserved |
| Pkt_Select | 10:0 | Select pointer to requested packet |

Figure 7:
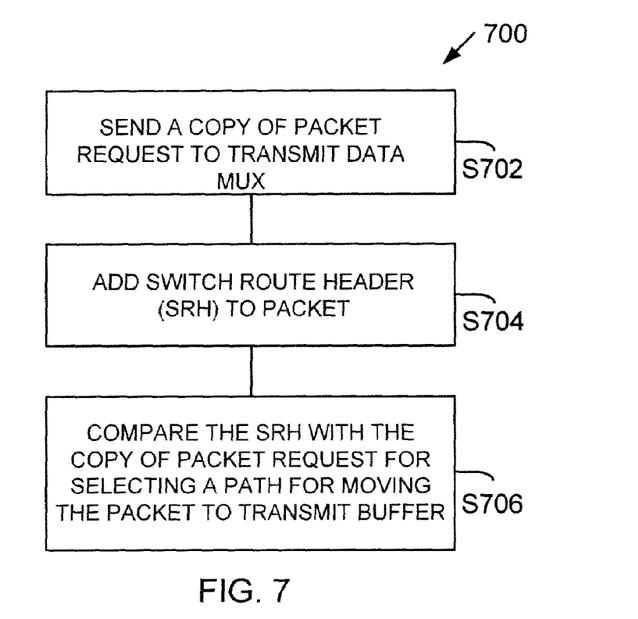
FIG. 7 is a flowchart illustrating a process for real time data path selection for a shared multi-path crossbar, according to one embodiment.

FIG. 7 is a flowchart illustrating a process 700 for real time data path selection for a shared multi-path crossbar according to one embodiment. Referring now to FIGS. 6 and 7, packet requests selected by tag arbiter module 410 are sent to Tx request merge module 422 and forwarded to Rx request merge module 426 allowing the packet to be fetched from the receive buffer as previously described. In one embodiment, at the time the packet request is being sent to Tx request merge module 422, a copy of the packet request 604 is sent from tag arbiter 410 to transmit data mux 424 (S702). As previously described, the packet request may include information regarding Ingress Mport, Ingress S-port and the Ingress Receive Buffer location where the packet is stored.

The packet being fetched is sent to the receive data mux 430. Before the packet is forwarded to transmit data mux 424, the SRH is added to the packet (S704).

Once the packet including the SRH is received at transmit data mux 424, the transmit data mux compares the SRH to the information provided in the copy of the packet request (S706). Based on the comparison, transmit data mux 424 may determines the Ingress Mport, the Ingress S-port making the request and the location where the packet is stored. Based on that a correct transmission path is selected to move the packet to transmit buffer 412.

Figure 8:
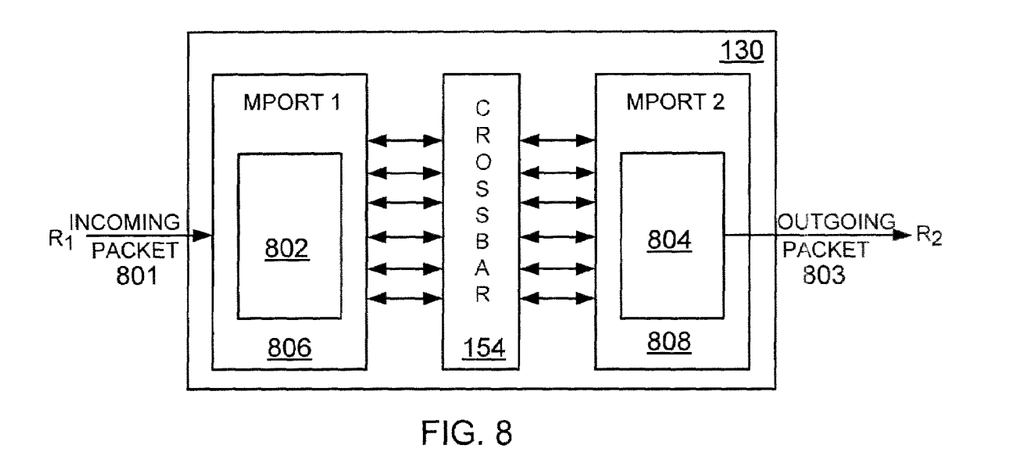
FIG. 8 is a simplified block diagram illustrating a system using port-to-port rate matching, according to one embodiment.

FIG. 8 is a simplified block diagram illustrating a portion of switch 112 (FIG. 1B) including a mechanism for port-to-port rate matching of Ingress port 802 that receives a packet 801 and Egress port 804 that transmits a packet 803, according to one embodiment. To provide low packet latency and high port bandwidth in switch 112, the Egress ports transmit packets as soon as the packets are received by switch 112. As previously described, switch ports, for example Mports 806 and 808, of switch 112 may be configured with 1×, 4× or 8× lane widths operating at 2.5, 5, 10 Gb/s or other transfer rates.

Because of the potential for different Ingress and Egress data rates, Egress ports of switch 112 are configured to start sending Ingress packets as soon as enough data has arrived at the Ingress port ensuring that the Egress port does not run out of data before the end of the packet has been transmitted.

In one embodiment, switch 112 includes a mechanism for timing when to send packet tags to the Egress port such that when the packet tag is received it is safe to transmit the tag. In one embodiment, the mechanism has Ingress port 802 sending the packet tag data to the destination Egress port 804 such that Egress port 804 does not run out of data regardless of the Ingress or Egress lane width or speed.

Figure 9:
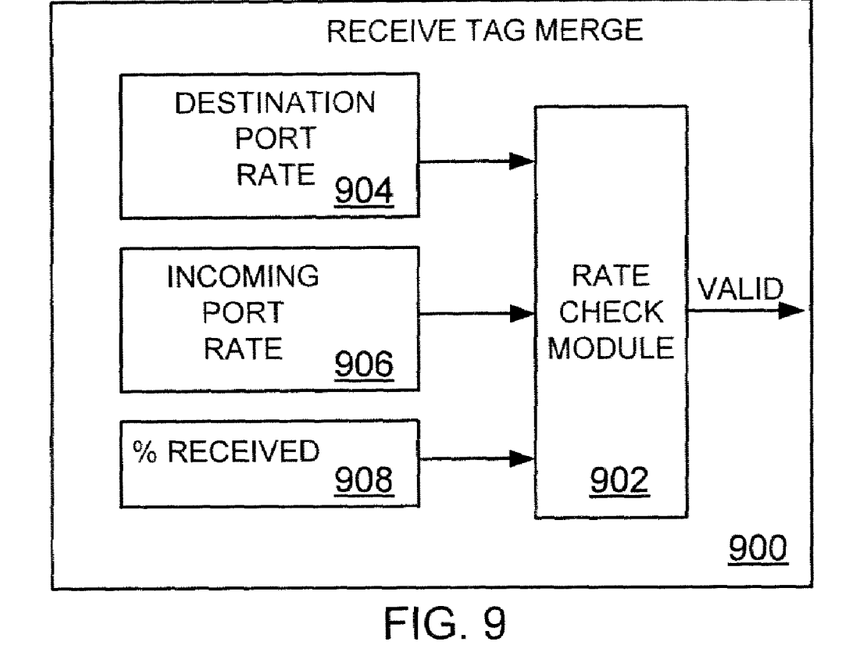
FIG. 9 is a simplified block diagram illustrating a mechanism for port-to port rate matching, according to one embodiment.

FIG. 9 is a block diagram illustrating an Ingress port tag merge module 900 (similar to Tx tag merge module 428, FIG. 4) including a rate check module 902, which receives information from a destination port rate module 904, an incoming port rate module 906 and percent data received module 908. Rate check module 902 may determine whether to send a tag or not based on the three inputs.

Referring now to FIGS. 8 and 9, in one exemplary embodiment, Ingress port 802 generates a tag and sends tag to the receive tag merge module 900. Along with the tag, three pieces of information are provided to rate check module 902 via modules 904, 906 and 908. Module 906 provides the combined lane width and speed at which Ingress port 802 is operating. Similarly, module 904 provides information regarding the lane width and speed at which all of the destination ports operate. Module 908 provides an indicator as to the percent data received (tag fill indicator). Thus, for example, module 908 may indicate when the tag fill is less than 50% received, at 50% received, 75% received or 100% received.

The following is an operational example of the port-to-port matching operation in accordance with an embodiment. Ingress port 802 receives a packet and needs to route the packet to Egress port 804. In this example, Ingress port 802 is configured to four lanes (4x) and 5 Gb/s (DDR). Egress port 804 is configured to four lanes (4x) and 10 Gb/s (QDR). Thus, Egress port 804 is transferring data twice as fast as Ingress port 802. Once the rate ratio is known, it can be determined that Egress port 804 may not start sending the packet received on Ingress port 802 until 50% or more of the packet has been received. Accordingly, rate check module 902 blocks the tag command until module 908 indicates that 50% or more of the packet has been received. Thus, underruns, transit idle time and gaps, which normally cause an error at Egress port 804 are avoided.

Figure 10:
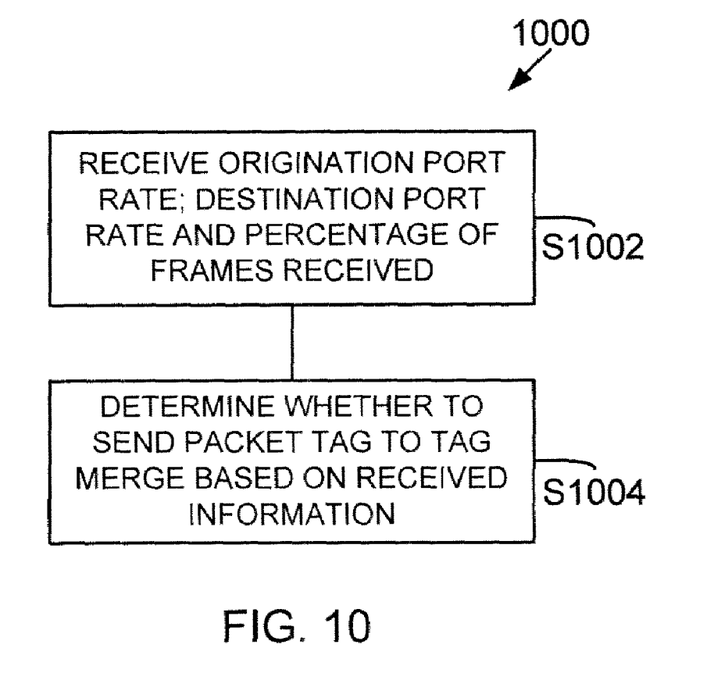
FIG. 10 is a flowchart of a process for port-to port rate matching, according to one embodiment.

FIG. 10 is a flowchart showing a process 1000 of a port-to-port matching operation in accordance with an embodiment. In block S1002, information is received including the combined lane width and speed at which Ingress port 802 is operating, the combined lane width and speed at which all of the destination ports are operating and an indication as to the percent data received at. In block S1004, a determination is made to send a tag to its destination based on this received information. The determination may be based on priorities similar to those exemplified by the sample configurations provided in Table 2. For example, if the ratio between the rate of the Egress port to the Ingress port is, for example, 2 to 1, then the tag is held until at least 50% of the data has landed at the Ingress port to avoid underruns.

TABLE 2

| Source (4x) | Destination (4x) | Fill | Valid |
| --- | --- | --- | --- |
| 2.5 Gb/s | 5 Gb/s | 50% | Yes |
| 2.5 Gb/s | 10 Gb/s | 50% | No |
| . | . | . | . |

TABLE 2-continued

| Source (4x) | Destination (4x) | Fill | Valid |
| --- | --- | --- | --- |
| . | . | . | . |
| 10 Gb/s | 5 Gb/s | Less than 50% | Yes |

In one embodiment, a switch element with a plurality of Mports is provided. Each Mport includes as plurality of operational, S-ports. The S-ports can communicate with each other using a global crossbar and a local cross bar. Because of the Mport structure, individual ports are not hardwired. This saves real estate on a switch chip and chassis and also reduces complications during design and switch manufacturing.

In one embodiment, the switch element is configured to operate as an IB switch, a Fibre Channel switch, a Fibre Channel over Ethernet (FCOE) switch or a switch element complying with other standard or protocol.

In another embodiment, a real time data path selection process and structure is provided. An Egress port that requests a packet from an Ingress port receives the packet on 1 to N (for example, 6) shared paths from 1 to M Mports using 1 to P paths (for example, 9 Mports using 1 to 54 paths). Using the SRH as described above, proper lane and path selection is achieved.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A switch element comprising:
a plurality of megaports, each megaport uniquely identified by a unique megaport address identifier for network addressing;
wherein each megaport includes:
a plurality of operational ports, each operational port identified by a unique operational port address identifier,
a local crossbar for communication between the plurality of operational ports, and
a shared logic module configured to provide common control of the plurality of operational ports within a megaport to allow operational ports to share resource of a single megaport to route network packets therebetween; and
a global crossbar configured to allow communication between the megaports, wherein the operational ports include:
a receive segment for receiving an incoming network packet and temporarily storing the network packet at a packet storage location;

a tag writer module configured to create a tag for the network packet received at the receive segment, the tag including information about the network packet and a packet storage location; wherein the tag created by the tag writer is stored at a tag storage location of a transmit segment that is used to transmit the received network packet; and a tag arbiter for selecting a request from among a plurality of requests stored at the tag storage location, wherein the network packet identified by the request is pulled from the packet storage location and transmitted to a network packet destination.

2. The switch element of claim 1, further comprising a control port configured to store control settings for controlling operations of the plurality of megaports of the switch element.

3. The switch element of claim 1, wherein the tag includes a receive segment identifier that identifies the operational port receiving the network packet, an outbound port virtual lane identifier assigned to transmit the network packet, a total network packet size and an indicator to a location where the network packet is stored.

4. The switch element of claim 1, wherein the shared logic module comprises a receive tag merge module for receiving a tag from the tag writer and delivering the tag to a transmit tag merge module, the transmit tag merge module configured for forwarding the tag to the tag storage location in the transmit segment.

5. The switch element of claim 4, wherein the tag arbiter module selects the request from the plurality of requests in the tag storage location using a round-robin scheme and sends the selected request to the transmit request merge module and the transmit request merge module forwards the request to the receive request merge module.

6. The switch element of claim 5, wherein the packet identified by the request is fetched from its location in the packet storage location and sent to a transmit buffer on the transmit segment to be forwarded to the network packet destination.

7. The switch element of claim 4, wherein the transmit tag merge module is configured to determine whether or not to forward the tag based on a combined lane width and speed at which the network packet origination operational port is operating, a lane width and speed at which a destination operational port is operating and an indication as to a percent of the network packet received at the receive segment of the operational port.

8. The switch element of claim 1, wherein the tag arbiter is configured to send a copy of the selected request to a transmit data mux and a switch routing header (SRH) is added to the network packet, the SRH identifies the operational port that received the network packet and provides a storage location of the network packet.

9. The switch element of claim 8, wherein upon receiving the network packet including the SRH, the transmit data mux is configured to compare the SRH to the information provided in the copy of the packet request to determine the megaport and operational port making the request and place the network packet on a correct transmission path.

10. The switch element of claim 1, wherein the shared logic module comprises a routing table used for routing the network packets to a network packet destination.

11. The switch element of claim 1, wherein the switch element is an InfiniBand switch element.

12. The switch element of claim 1, wherein the switch element is a Fibre Channel switch element.

13. The switch element of claim 1, wherein the switch element is a Fibre Channel Over Ethernet (FCOE) switch element.

14. A process for receiving and transmitting network packets in a switch element having a plurality of megaports, each megaport having a plurality of operational ports and a shared logic module, the process comprising:

(a) receiving a packet at a receive segment of an operational port of one of the plurality of megaports;

(b) generating a request to fetch the received packet from the receive segment;

(c) sending a copy of the request to a transmit segment of the first operational port; wherein the request includes information regarding a location where the packet is stored at the receive segment and identity of the operational port that received the packet;

(d) adding a switch routing header (SRH) to the packet before sending the packet to the transmit segment of the operational port; wherein the SRH identifies the operational port that received the packet and the location where the packet is stored;

(e) comparing the SRH in the packet with information provided in the request; and (f) placing the packet on a correct transmission path for temporary storage at the transmit segment, before the packet is transmitted to a proper destination.

15. The process of claim 14, wherein the switch element is an InfiniBand switch element.

16. The process of claim 14, wherein the switch element is a Fibre Channel switch element.

17. The process of claim 14, wherein the switch element is a Fibre Channel Over Ethernet (FCOE) switch element.

18. A process for receiving and transmitting network packets in a switch element having a plurality of megaports, each megaport having a plurality of operational ports and a shared logic module, the process comprising:

(a) receiving a packet at a receive buffer of a operational port of one of the plurality of megaports;

(b) generating a packet tag with information related to the packet including a location of the packet in the receive buffer;

(c) storing the packet tag in a tag buffer of the operational port; and (d) determining whether or not to forward the tag based on a combined lane width and speed at which the operational port is operating, a lane width and speed at which a destination operational port is operating and an indication as to a percent data received at operational port.

19. The process of claim 18, further comprising:

generating a request based on the packet tag received in the tag buffer;

selecting the packet tag identified by the request from the tag buffer;

fetching the packet associated with the packet tag from its location in the receive buffer; and forwarding the packet to the destination operational port.

20. The process of claim 18, wherein the switch element is an InfiniBand switch element.

21. The process of claim 18, wherein the switch element is a Fibre Channel switch element.

22. The process of claim 18, wherein the switch element is a Fibre Channel Over Ethernet (FCOE) switch element.

* * * * *

UNITED STATES PATENT AND TRADEMARK OFFICE
CERTIFICATE OF CORRECTION

| | | |
|---|---|---|
| PATENT NO. | : 8,068,482 B2 | Page 1 of 1 |
| APPLICATION NO. | : 12/556064 | |
| DATED | : November 29, 2011 | |
| INVENTOR(S) | : Kunz et al. | |

It is certified that error appears in the above-identified patent and that said Letters Patent is hereby corrected as shown below:

In column 4, line 21, after "memory" insert -- ), --.

In column 5, line 45, delete "(4 G" and insert -- (4G --, therefor.

In column 5, line 50, delete "crossbars" and insert -- crossbar, --, therefor.

In column 6, line 41, after "clarity" insert -- , --.

In column 7, line 64, after "make" insert -- it --.

In column 10, line 10, delete "as" and insert -- a --, therefor.

Signed and Sealed this
Twenty-eighth Day of February, 2012

David J. Kappos
*Director of the United States Patent and Trademark Office*